Feb. 12, 1935.  C. W. MIDDLETON  1,990,661
VEHICLE SEAT
Filed May 11, 1934
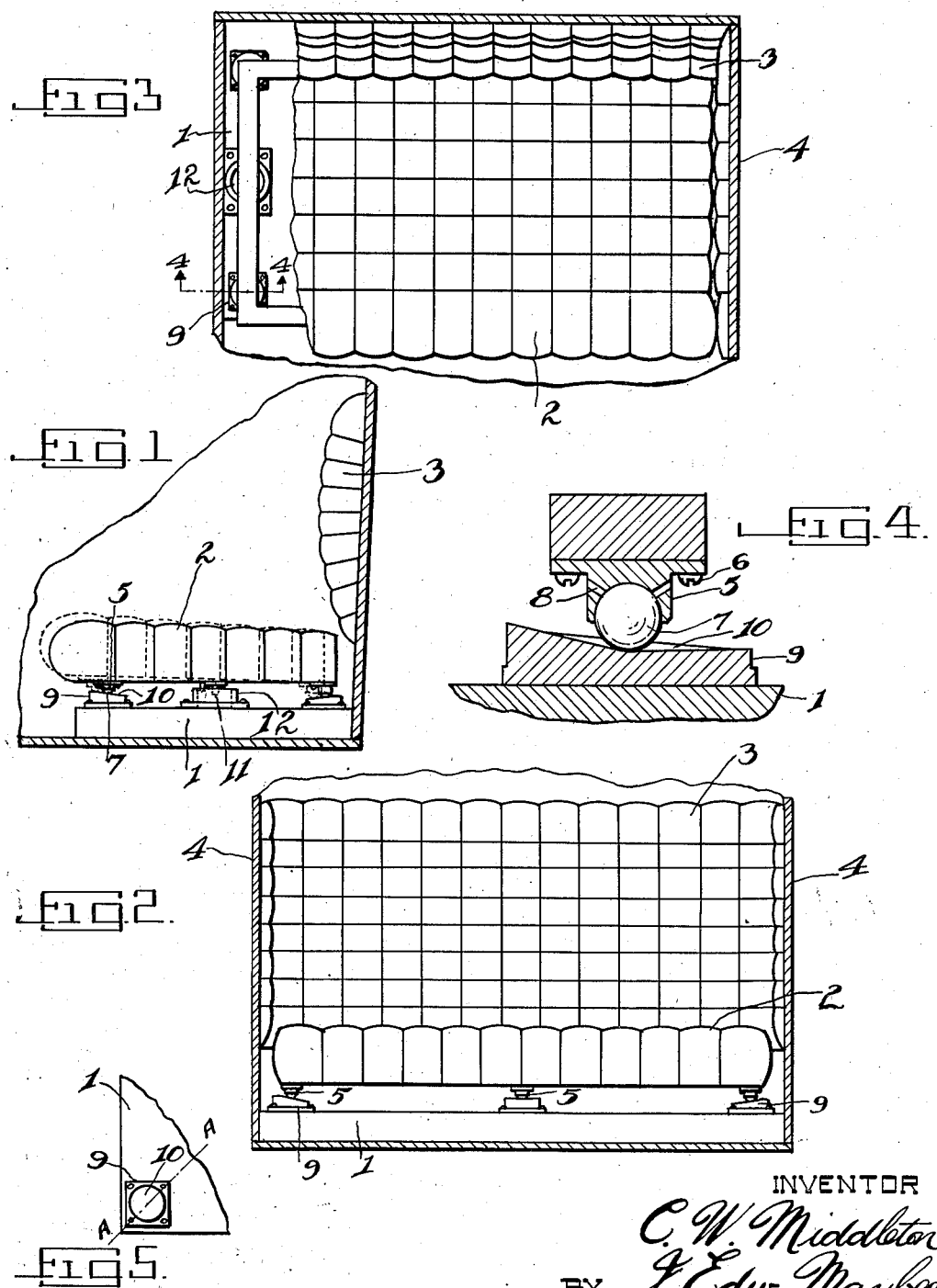
INVENTOR
C. W. Middleton
BY J. Edw. Maybee
ATTY Patented Feb. 12, 1935

1,990,661

UNITED STATES PATENT OFFICE 1,990,661

VEHICLE SEAT

Charles William Middleton, Toronto, Ontario, Canada

Application May 11, 1934, Serial No. 725,028

2 Claims. (Cl. 155—9)

This invention relates to vehicle seats and the object of the invention is to devise cushioning or shock-absorbing means for horizontal shocks such as are caused by the sudden checking, accelerating, or turning of a vehicle, or a combination checking or accelerating and turning.

I attain my object by constructing the vehicle seat in the manner hereinafter more particularly described and illustrated in the accompanying drawing in which Figure 1 is an end elevation of the seat;

Figure 2 a front view;

Figure 3 a plan view;

Figure 4 a section on the line 4—4 in Figure 3; and

Figure 5 a plan view of one of the supporting plates.

In the drawing corresponding numbers refer to corresponding parts in the different figures.

1 represents the base upon which the cushion or seat member 2 is mounted. The base 1 may be constructed of any suitable material and in any suitable manner and may or may not be raised above the floor of the vehicle. The seat assembly will ordinarily include a back 3, preferably upholstered, and ends 4 likewise preferably upholstered. A space is left between the seat member 2 and the sides and back of the seat assembly to permit movement of said seat member as hereinafter described.

Adjacent each corner of the seat member 2 is mounted a supporting member comprising a socket 5 secured to the underside of the frame of the seat member 2 by means of screws 6 or other fastening means. Mounted in the socket 5 is a ball 7 and suitable oiling apertures 8 are provided in the socket to lubricate the ball seat. In addition to the supporting members 5 at each corner of the seat member, other such supporting members 5 may be mounted at other points beneath the seat member, and one such supporting member is illustrated in Figure 2 centrally of the outer edge of the seat member 2.

Bearing plates 9 are mounted on the base 1 and are provided with bearing surfaces 10 upon which the balls 7 are adapted to move. The bearing surface is cupped and tilted, the surface being preferably in the form of a conical concavity as illustrated more particularly in Figure 4. The balls 7 normally rest substantially at the central point or apex of the cupped bearing surfaces 10, and are movable thereon so that in the event of sudden checking or acceleration or turning of the vehicle the seat will by the force of its inertia slide in a fore and aft direction, or laterally or both laterally and in a fore and aft direction, as the case may be, against the action of gravity, thus cushioning or breaking the shock. In Figure 1 the seat is shown in dotted lines in its extreme forward position which it would adopt in the event of sudden checking of the vehicle's motion.

The bearing surface 10 of each corner bearing plate 9 is, as already stated, tilted, the highest point of each bearing surface being at the outer forward side and the lowest point at the inner rearward side. In Figure 5 the line A—A, positioned at an angle of 45° to the seat front illustrates the direction of tilting of the bearing surface 10, and the lowest point of said bearing surface is located on the line A—A, at the inner side of the bearing plate 10 and the highest side is located on the line A—A adjacent the outer side of the bearing plate 9. The bearing surface 10, when conical, is so tilted that a line drawn from the center thereof to the inner edge along the line A—A would be substantially horizontal. The degree of cupping of the bearing surface 10 would depend upon the circumstances, the angle to be such that a sudden horizontal shock would be normally absorbed by the force required for the seat 2 to slide up the cupped surface against the force of gravity.

The purpose of the tilting of the bearing surface 10 as described is to give the seat member 2 a banking effect. For instance, if the vehicle suddenly checks the seat will move forward as illustrated in dotted lines in Figure 1. The front part of the seat will rise on the bearing surfaces 10 at each front corner of the seat. The rear of the seat will travel out nearly horizontally. Similarly, the seat travels sideways on a sudden turn and rises at the outer or leading end or backwards on a sudden acceleration of the vehicle and rises at the back.

If the speed of the vehicle changes on a turn the seat will move both in a fore and aft and a lateral direction and will be banked on a line, which is the resultant of the two movements.

The angle of tilting of other bearing plates, such as the one illustrated in Figure 2 centrally of the front of the seat will be adjusted so that the ball 7 will remain in contact with the plate at all times.

To prevent the seat from sliding off the bearing surfaces 10, a stop is provided, which permits limited movement only in all directions. A suitable stop is illustrated in Figures 1 and 3 and comprises a lug or pin 11 secured to the underside of the seat member 2 at each end thereof and extending into a cylindrical cup 12 on the base 1. The inside diameter of the cup 12 is slightly less than the diameter of the bearing surfaces 10.

It will be understood that the position of the bearing plates 9 and the supporting members 5, may be reversed, and the bearing plates mounted on the seat member 2, and the supporting members 5 mounted on the base 1, and such a construction would be the full mechanical equivalent of the construction previously described and hereafter claimed.

It will be seen from the above description that I have devised a seat adapted to cushion or break horizontal shocks and also to give a banking effect to the seat which enables persons seated thereon more readily to resist such shocks.

It also possesses the advantage that the seat rolls and tends to level itself when the vehicle is on an inclined surface such as a hill or highly crowned road.

What I claim as my invention is:

1. In a vehicle seat, a substantially horizontal base; a rectangular seat member having a rigid frame; supporting members in the underside of the frame adjacent each corner thereof and having a fixed position relative thereto; and bearing plates on the base having inverted cone-shaped bearing surfaces upon which the supporting members rest, the supporting members resting normally at substantially the central point of the bearing surfaces of the bearing plates, and the bearing surfaces of the plates being tilted so that the highest and lowest points are substantially on a line at an angle of 45° to the seat front, the highest point being outermost.

2. In a vehicle seat, a substantially horizontal base; a rectangular seat member having a rigid frame; supporting members in the underside of the frame adjacent each corner thereof and having a fixed position relative thereto; and bearing plates on the base having inverted cone-shaped bearing surfaces upon which the supporting members rest, the supporting members resting normally at substantially the central point of the bearing surfaces of the bearing plates, and the bearing surfaces of the plates being tilted so that the highest and lowest points are substantially on a line at an angle of 45° to the seat front, the highest point being outermost; and stop means permitting of limited sliding movement of the bearing member on the supporting plate in all directions.

CHARLES WILLIAM MIDDLETON.